United States Patent
Sainomoto

(10) Patent No.: US 8,325,745 B2
(45) Date of Patent: Dec. 4, 2012

(54) SWITCH, NETWORK SYSTEM AND TRAFFIC MOVEMENT METHOD

(75) Inventor: Yoshitaka Sainomoto, Fujisawa (JP)

(73) Assignee: Alaxala Networks Corporation, Kawasaki (JP)

(*) Notice: Subject to any disclaimer, the term of this patent is extended or adjusted under 35 U.S.C. 154(b) by 231 days.

(21) Appl. No.: 12/816,902

(22) Filed: Jun. 16, 2010

(65) Prior Publication Data

US 2010/0322260 A1    Dec. 23, 2010

(30) Foreign Application Priority Data

Jun. 18, 2009   (JP) .................................. 2009-145107

(51) Int. Cl.
*H04L 12/56* (2006.01)
(52) U.S. Cl. ........ 370/401; 370/252; 370/254; 370/255; 709/224
(58) Field of Classification Search .................. 370/252, 370/254–255; 709/224
See application file for complete search history.

(56) References Cited

U.S. PATENT DOCUMENTS

| | | | | |
|---|---|---|---|---|
| 4,031,517 A | * | 6/1977 | Hirtle | 703/24 |
| 7,822,034 B2 | | 10/2010 | Okagawa | |
| 7,996,516 B2 | * | 8/2011 | King et al. | 709/224 |
| 8,027,265 B2 | * | 9/2011 | Chu et al. | 370/252 |

FOREIGN PATENT DOCUMENTS

| | | |
|---|---|---|
| JP | 2007-181049 | 7/2007 |
| JP | 2008-035437 | 2/2008 |
| JP | 2008-245193 | 10/2008 |

* cited by examiner

*Primary Examiner* — Robert Wilson
*Assistant Examiner* — Mohamed Kamara
(74) *Attorney, Agent, or Firm* — Foley & Lardner LLP

(57) ABSTRACT

In an FDB provided for a switch, line information associated with MAC address information is managed separately for sending destination line information and receiving discrimination line information, and provides an incompatibility permission flag of permitting that they are different. Also, a function of rewriting the sending destination line information with a command from a manager is provided and linked with the change of the incompatibility permission flag. While the traffic is moved to a new line at the time of the line switching, this incompatibility is permitted, and even if a frame is received from an old line, the receiving line is not updated based on the frame.

9 Claims, 14 Drawing Sheets

1101-1

| FDB | 1102-1 SENDING DESTINATION LINE | 1103-1 RECEIVING DISCRIMINATION LINE | 1105-1 |
|---|---|---|---|
| MAC ADDRESS | | | INCOMPATIBILITY PERMISSION FLAG |
| MAC 11 | LINE 4 | LINE 4 | INCOMPATIBILITY IMPOSSIBLE |
| MAC 12 | LINE 4 | LINE 4 | INCOMPATIBILITY IMPOSSIBLE |
| MAC 21 | LINE 1 | LINE 1 | INCOMPATIBILITY IMPOSSIBLE |
| MAC 22 | LINE 1 | LINE 1 | INCOMPATIBILITY IMPOSSIBLE |

(columns: 1102-1, 1103-1, 1104-1, 1105-1); rows E1, E2, E3, E4

FIG. 8A 1101-2

| FDB MAC ADDRESS | SENDING DESTINATION LINE | RECEIVING DISCRIMINATION LINE | INCOMPATIBILITY PERMISSION FLAG |
|---|---|---|---|
| MAC 11 | LINE 4 | LINE 4 | INCOMPATIBILITY IMPOSSIBLE |
| MAC 12 | LINE 4 | LINE 4 | INCOMPATIBILITY IMPOSSIBLE |
| MAC 21 | LINE 6 | LINE 1 | INCOMPATIBILITY POSSIBLE |
| MAC 22 | LINE 6 | LINE 1 | INCOMPATIBILITY POSSIBLE |

FIG. 8B 1101-3

| FDB MAC ADDRESS | SENDING DESTINATION LINE | RECEIVING DISCRIMINATION LINE | INCOMPATIBILITY PERMISSION FLAG |
|---|---|---|---|
| MAC 11 | LINE 4 | LINE 4 | INCOMPATIBILITY IMPOSSIBLE |
| MAC 12 | LINE 4 | LINE 4 | INCOMPATIBILITY IMPOSSIBLE |
| MAC 21 | LINE 6 | LINE 6 | INCOMPATIBILITY POSSIBLE |
| MAC 22 | LINE 6 | LINE 6 | INCOMPATIBILITY POSSIBLE |

FIG. 8C 1106-1

| FDB | | | |
|---|---|---|---|
| MAC ADDRESS (1107-1) | SENDING DESTINATION LINE (1108-1) | RECEIVING DISCRIMINATION LINE (1109-1) | INCOMPATIBILITY PERMISSION FLAG (1110-1) |
| MAC 21 | LINE 5 | LINE 5 | INCOMPATIBILITY IMPOSSIBLE |
| MAC 22 | LINE 5 | LINE 5 | INCOMPATIBILITY IMPOSSIBLE |
| MAC 11 | LINE 1 | LINE 1 | INCOMPATIBILITY IMPOSSIBLE |
| MAC 12 | LINE 1 | LINE 1 | INCOMPATIBILITY IMPOSSIBLE |

| FDB | | | |
|---|---|---|---|
| MAC ADDRESS (1107-2) | SENDING DESTINATION LINE (1108-2) | RECEIVING DISCRIMINATION LINE (1109-2) | INCOMPATIBILITY PERMISSION FLAG (1110-2) |
| MAC 21 | LINE 5 | LINE 5 | INCOMPATIBILITY IMPOSSIBLE |
| MAC 22 | LINE 5 | LINE 5 | INCOMPATIBILITY IMPOSSIBLE |
| MAC 11 | LINE 6 | LINE 6 | INCOMPATIBILITY IMPOSSIBLE |
| MAC 12 | LINE 6 | LINE 6 | INCOMPATIBILITY IMPOSSIBLE |

FDB    1202        1203                  1204

| MAC ADDRESS | LINE INFORMATION | INCOMPATIBILITY PERMISSION FLAG |
|---|---|---|
| MAC 21 | LINE 5 | INCOMPATIBILITY IMPOSSIBLE |
| MAC 22 | LINE 5 | INCOMPATIBILITY IMPOSSIBLE |
| MAC 11 | LINE 1 | INCOMPATIBILITY IMPOSSIBLE |
| MAC 12 | LINE 1 | INCOMPATIBILITY IMPOSSIBLE |

SWITCH, NETWORK SYSTEM AND TRAFFIC MOVEMENT METHOD

CLAIM OF PRIORITY

The present application claims priority from Japanese patent application JP 2009-145107 filed on Jun. 18, 2009, the content of which is hereby incorporated by reference into this application.

BACKGROUND OF THE INVENTION

1. Field of the Invention

The present invention relates to a switch, a network system and a traffic movement method, and more particularly to a switch, a network system and a traffic movement method for use in a layer 2 network having a layer 2 switch.

2. Description of the Related Art

In a layer 2 network configured using a layer 2 switch, it may be desired in some cases to change lines in a certain section because of a line trouble, deterioration or speed-up. In this case, for the reason that the line is already active, it is desired to change this line without lacking communication in the currently flowing traffic.

In such a case, as a first technique there is a method for changing the lines using a link aggregation as defined in the IEEE802.3ad. Herein, the line in current use is called an old line, and the line after changing is called a new line. There is another method that once a configuration of link aggregation is built of the new line and the old line, the traffic is moved from the old line to the new line by blocking the old line or using a function of the link aggregation.

Reference to FIGS. 1, 2 and 3 is made for explanation. Herein, FIG. 1 shows a layer 2 network (100) configured using a layer 2 switch. FIG. 2 is a diagram showing in excerpt a layer 2 switch 1 (201), a layer 2 switch 2 (202), and four terminals as exemplified in the layer 2 network (100). Herein, the case of changing a line 1 (401) is considered. A line 6 (406) is connected as the new line, and the configuration is built with the line 1 (401) and the line 6 (406) as the link aggregation, as shown in FIG. 3. Thereafter, the line 1 (401) is blocked, and the traffic via the line 1 (401) is moved via the line 6 (406) using the link aggregation function.

A second technique not using the link aggregation is a method that two lines of the old line and the new line are temporarily connected between the apparatuses, and the traffic is moved from the old line to the new line by clearing an FDB (also called Forwarding Data Base, Filtering Data Base).

Reference to FIGS. 2, 4 and 5 is made for explanation. Herein, FIG. 2 has been already described above. FIGS. 4A to 4C are diagrams in which the line 6 (406) of the new line is connected in FIG. 2, and a traffic flow is additionally written in accordance with a procedure based on this line 6. FIG. 4A is a diagram in which the line 6 (406) of the new line to be changed from the line 1 (401) is connected from a state of FIG. 2. FIG. 4B shows the traffic flow before changing. In the figure, arrows (501) and (502) indicate the traffic flows. FIG. 4C shows traffic flows (503) to (506) after clearing the FDB in the layer 2 switch 1 (201). FIGS. 5A to 5C show an FDB (601) of the layer 2 switch 1 (201) and an FDB (604) of the layer 2 switch 2 (202) at the timing of each of FIGS. 4A to 4C. In each figure, E1 to E4 designate the entries of FDB.

Before clearing the FDB, the traffic flows (501) and (502) are via the line 1 (401), as shown in FIG. 4B. This is because the traffic is transferred in accordance with an FDB (601-2) and an FDB (604-2) as shown in FIG. 5B. Herein, an entry regarding the line 1 (401) of the layer 2 switch 1 (201) is cleared from the FDB (601-2). In this case, the entry (E3) and the entry (E4) apply and are cleared.

At this point of time, the traffic originated from a terminal 11 (301) and directed to a terminal 21 (303) in the traffic (501) and the traffic originated from a terminal 12 (302) and directed to a terminal 22 (304) in the traffic (502) become flooding. Because of flooding, the traffic also flows via the line 6 (406), and the traffic moves by way of the line 6 (406). In the layer 2 switch 2 (202), if the FDB is similarly cleared, the traffic originated from the terminal 21 (303) and the terminal 22 (304) and directed to the terminal 11 (301) and the terminal 12 (302) can be also moved.

At the point of time when the FDB is deleted, the communication is made by flooding. Therefore, the traffic flows to the line 6 (406), and at the same time the traffic is sent out to the line 1 (401). In this regard, if another means such as filtering is employed, it is possible to stop sending out the traffic to the line 1 (401).

Also, there was disclosed a technique for changing the port of output destination by providing a transfer switching table in addition to the FDB (e.g., refer to JP-A-2007-181049). For example, besides the FDB, a table for managing sending line information is provided to store a plurality of pieces of line information to be switched.

SUMMARY OF THE INVENTION

With the method using the link aggregation in the first technique as described above, the apparatuses on both sides for connecting the new line and the old line not only must support the link aggregation from the restrictions of the link aggregation, but also it is required that the new line and the old line are connected between the same apparatuses. That is, in the previous example, the line 1 (401) connecting the layer 2 switch 1 (201) and the layer 2 switch 2 (202) can not be changed to the line 3 (403) and the line 2 (402) via a layer 2 switch 3 (203) in FIG. 1.

Also, with the method using the FDB clear in the second technique as described above, if the traffic is temporarily stopped at the timing of clearing the FDB, the traffic is correctly moved. However, if the traffic is not stopped, the following problem arises.

If the traffic from the terminal 21 (303) or the terminal 22 (304) through the layer 2 switch 2 (202) in which the FDB clear is not yet performed is received via the line 1 (401) in the layer 2 switch 1 (201) immediately after the FDB is cleared in the layer 2 switch 1 (201), as shown in FIG. 4C, the terminal 21 (303) or the terminal 22 (304) is MAC learned again with the line 1 (401) as the line information, so that the layer 2 switch 1 (201) returns to a state before the FDB clear from an FDB (601-3) of FIG. 5C that is FDB cleared to the FDB (601-2) of FIG. 5B. Thereby, the movement of traffic is not completed, so that the traffic returns to the state via the line 1 (401). This is caused by the facts that it is difficult to perform the FDB clear in the layer 2 switch 1 (201) and the layer 2 switch 2 (202) at the same time, and the traffic usually flows in both directions. That is, with the method using the FDB clear, the MAC learning is made again on the old line, depending on the FDB clear and the arrival timing of traffic, resulting in a problem that the traffic may not be correctly moved in some cases.

In the light of the above-mentioned matters, an object of the invention is to provide a switch, a network system and a traffic movement method for moving the traffic from a first line to a second line.

Also, it is another object of the invention to rewrite line information to be referred to at the time of sending out with line information of destination to move the traffic and change the line for traffic without becoming in a flooding state while at work to move the traffic from the first line to the second line. Also, it is a further object of the invention to hold separately line information to be referred to at the time of sending out and line information for judging the MAC address learning at the time of reception and keep the line at the time of sending out in a state after change by limiting the influence of MAC address learning to a line at the time of reception even if the line at the time of sending out and the line at the time of reception are different. That is, an another object of the invention is to make it possible to move the traffic from the old line to the new line, without depending on the arrival timing of traffic in communication between the two layer 2 switches being communicated.

The invention manages, for the FDB that the layer 2 switch has, the line information associated with the MAC address information separately for sending destination line information and receiving discrimination line information, and provides an incompatibility permission flag indicating to permit the state designating these two different lines. Also, a function of rewriting the sending destination line information with any command such as a manager command, configuration or a Simple Network Management Protocol (SNMP) is provided and linked with changing of the incompatibility permission flag to be possible or not.

The invention provides, for example, a switch for receiving a frame from a line through a line control section and extracting the source MAC address and the sending destination MAC address of the received frame, with an FDB holding cumulatively the line information associated with the MAC address, in which as a first FDB search, the line information is newly stored, if the line information associated with the MAC address matched with the source MAC address of the frame is not provided in a database, or if it is provided in the database, the FDB is updated, and as a second FDB search, the line of transfer destination is determined from the line information associated with the MAC address matched with the sending destination MAC address of the frame, and the frame is transferred via a switching mechanism to an appropriate line through the line control section, comprising a mechanism for separately holding the sending line information and the receiving line information associated with the MAC address in the FDB, and a mechanism for holding the incompatibility permission flag associated with the MAC address in the FDB, wherein in the first FDB search, the corresponding sending line information, receiving line information and incompatibility permission flag are derived, if the line information associated with the source MAC address is provided in the database, if the incompatibility permission flag indicates the incompatibility impossible, the three lines including the sending line information, the receiving line information and the line receiving the frame are compared, in which if they are not consistent, the sending line information and the receiving line information are updated with the information of the line receiving the frame, and if the incompatibility permission flag indicate the incompatibility possible, the receiving line information and the line receiving the frame are compared, in which if they are not consistent, the receiving line information is updated with the information of the line receiving the frame.

The invention provides, for example, a switch for receiving a frame from a line through a line control section and extracting the source MAC address and the sending destination MAC address of the received frame, with an FDB holding cumulatively the line information associated with the MAC address, in which as a first FDB search, the line information is newly stored, if the line information associated with the MAC address matched with the source MAC address of the frame is not provided in a database, or if it is provided in the database, the FDB is updated, and as a second FDB search, the line of transfer destination is determined from the line information associated with the MAC address matched with the sending destination MAC address of the frame, and the frame is transferred via a switching mechanism to an appropriate line through the line control section, comprising a mechanism for holding the line information associated with the MAC address in the FDB, and a mechanism for holding the incompatibility permission flag associated with the MAC address in the FDB, wherein in the first FDB search, the corresponding line information and incompatibility permission flag are derived, if the line information associated with the source MAC address is provided in the database, if the incompatibility permission flag indicates the incompatibility impossible, the line information and the line receiving the frame are compared, in which if they are not consistent, the line information is updated with the information of the line receiving the frame, and if the incompatibility permission flag indicate the incompatibility possible, the line information and the line receiving the frame are compared, in which if they are not consistent, the update of the line information is suppressed.

The above switch comprises a mechanism for rewriting the sending line information stored in association with the MAC address with any means in the FDB, a mechanism for rewriting the incompatibility permission flag stored in association with the MAC address with any means in the FDB, whereby the incompatibility permission flag and the sending line information can be arbitrarily rewritten upon a command from a manager and so on.

To the above switch, a management device issues the control information for controlling a traffic movement operation, including the information designating the line of object to change the incompatibility permission flag, the information designating the line of movement source, the information designating the line of movement destination, and the setting information of the incompatibility permission flag.

According to the first solving means of this invention, there is provided a switch comprising:

a memory for storing a MAC address, line identification information of lines including a first line and a second line, and incompatibility permission information indicating either incompatibility possible of permitting an incompatibility between the line on which a frame with the MAC address as a sender is received and the line indicated by the line identification information or incompatibility impossible of not permitting the incompatibility, associated with one another;

a transfer control section for referring to the MAC address of the memory in accordance with a destination MAC address of the frame received from the line to transfer the frame to the line conforming to the line identification information corresponding to the MAC address and, learning a correspondence between the MAC address and the line identification information in accordance with the source MAC address of received frame and the line receiving the frame; and a switch control section for controlling for moving a traffic of the first line of movement source to the second line of movement destination, wherein:

the incompatibility permission information of the memory pre-stores the information indicating the incompatibility impossible;

the switch control section inputs control information including the line identification information of the first line of movement source for traffic and the line identification information of the second line of movement destination, refers to the memory, changes the line identification information of the memory matched with the line identification information of the first line of the movement source to the line identification information of the second line of the movement destination, and changes the incompatibility permission information corresponding to changed line identification information to the information of the memory indicating the incompatibility possible; and the transfer control section, upon receiving the frame from the line, searches the memory for the MAC address matched with the source MAC address to refer to corresponding incompatibility permission information, not perform an update of the line identification information of the memory based on the received frame if the incompatibility permission information indicates the incompatibility possible, changes the line identification information corresponding to the MAC address of the memory to the identification information of the line receiving the frame if the incompatibility permission information indicates the incompatibility impossible.

According to the second solving means of this invention, there is provided a network system comprising:

a first switch that is the switch according to claim 1;

a second switch that is the switch according to claim 1 and connected to the first switch via the line; and a management device that outputs the control information to the first switch and/or second switch.

According to the third solving means of this invention, there is provided a traffic movement method for moving a traffic between a first switch and a second switch from a first line to a second line, in which the first switch and the second switch transfer a frame to a line conforming to the line identification information associated with a destination MAC address of a received frame by referring to a memory for storing a MAC address, line identification information of lines including the first line and the second line, and incompatibility permission information indicating either incompatibility possible of permitting an incompatibility between the line on which the frame with the MAC address as a sender is received and the line indicated by the line identification information or incompatibility impossible of not permitting the incompatibility, associated with one another, wherein:

the first switch inputs control information including the line identification information of the first line of movement source for traffic and the line identification information of the second line of movement destination, refers to the memory of the first switch, changes the line identification information of the memory matched with the line identification information of the first line of the movement source to the line identification information of the second line of the movement destination, and changes the incompatibility permission information corresponding to changed line identification information of the memory to the information indicating the incompatibility possible;

the first switch, upon receiving the frame from the first line, searches the memory of the first switch for the MAC address matched with the source MAC address to refer to corresponding incompatibility permission information and, not perform an update of the line identification information of the memory based on the received frame if the incompatibility permission information indicates the incompatibility possible;

the first switch sends the frame to the second switch via the second line in accordance with the line identification information associated with the destination MAC address of the frame received from the line; and the second switch, upon receiving the frame from the second line, searches the memory of the second switch for the MAC address matched with the source MAC address to refer to the corresponding incompatibility permission information and, changes if the incompatibility permission information indicates the incompatibility impossible, the line identification information associated with the MAC address of the memory to the identification information of the second line receiving the frame.

According to the invention, it is possible to provide a switch, a network system and a traffic movement method for moving the traffic from a first line to a second line.

Also, according to the invention, it is possible to rewrite line information to be referred to at the time of sending out with line information of destination to move the traffic and change the line for traffic without becoming in a flooding state while at work to move the traffic from the first line to the second line. Also, according to the invention, it is possible to hold separately line information to be referred to at the time of sending out and line information for judging the MAC address learning at the time of reception and keep the line at the time of sending out in a state after change by limiting the influence of MAC address learning to a line at the time of reception even if the line at the time of sending out and the line at the time of reception are different. That is, according to the invention, it is possible to make it possible to move the traffic from the old line to the new line, without depending on the arrival timing of traffic in communication between the two layer 2 switches being communicated.

BRIEF DESCRIPTION OF THE DRAWINGS

FIGS. 8A to 8C are views showing an FDB (1) in the traffic movement example according to the invention.

FIGS. 9A and 9B are views showing an FDB (2) in the traffic movement example according to the invention.

FIG. 10 is a view showing an FDB according to a second embodiment of the invention.

DESCRIPTION OF THE PREFERRED EMBODIMENTS

First Embodiment

Figure 1:
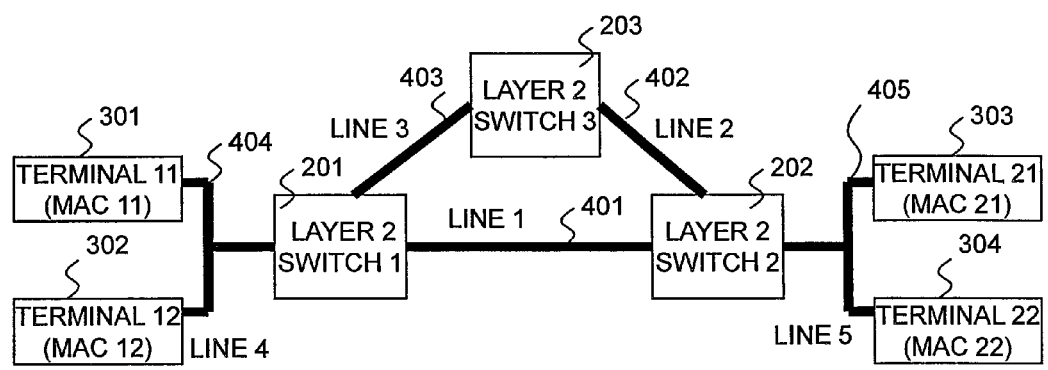
FIG. 1 is a diagram showing a network having a layer 2 switch.
Figure 2:
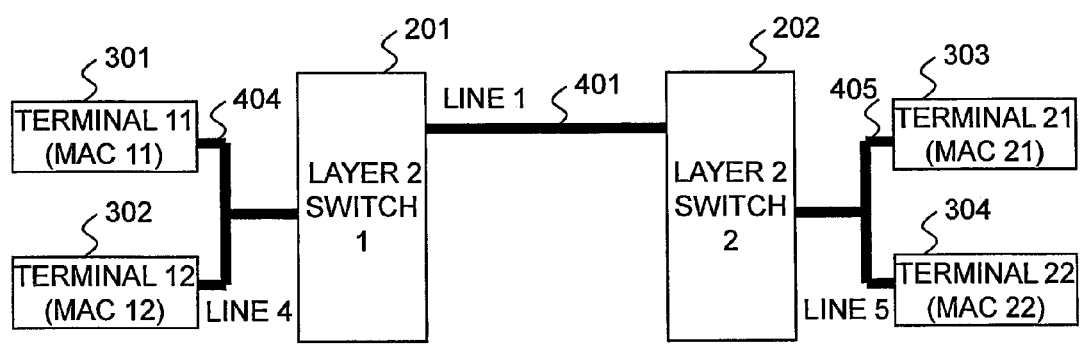
FIG. 2 is a diagram showing particularly two layer 2 switches in the network.
Figure 3:
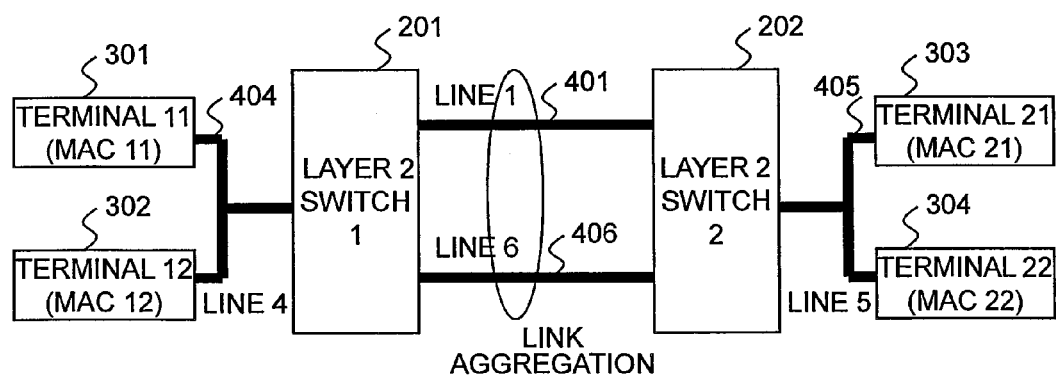
FIG. 3 is a diagram showing a traffic movement example using link aggregation.
Figure 4A:
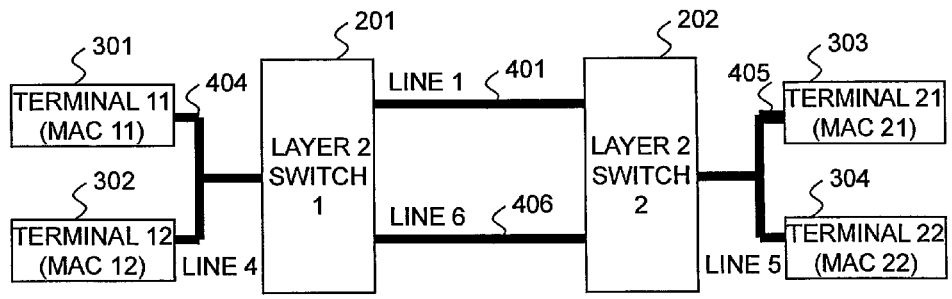
FIGS. 4A to 4C are diagrams showing a traffic movement example using an FDB clear.
Figure 4B:
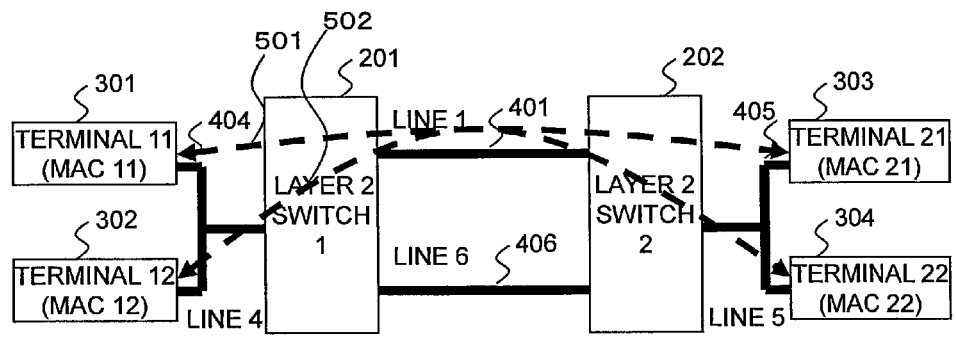
Figure 4C:
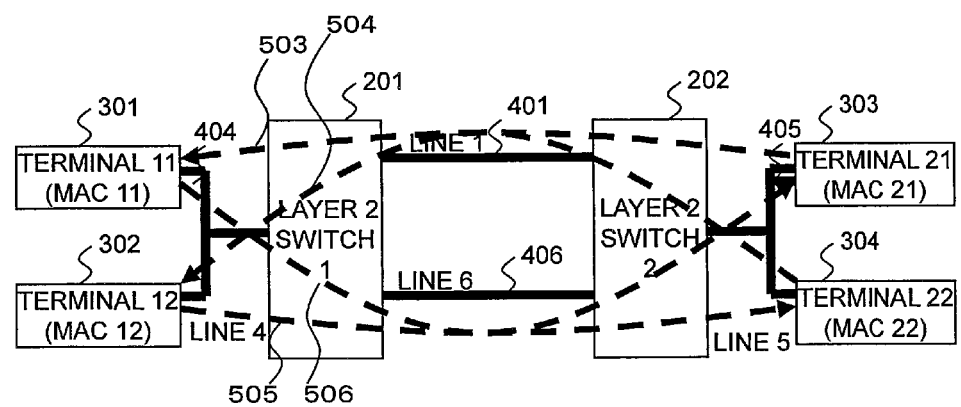
Figure 5A:
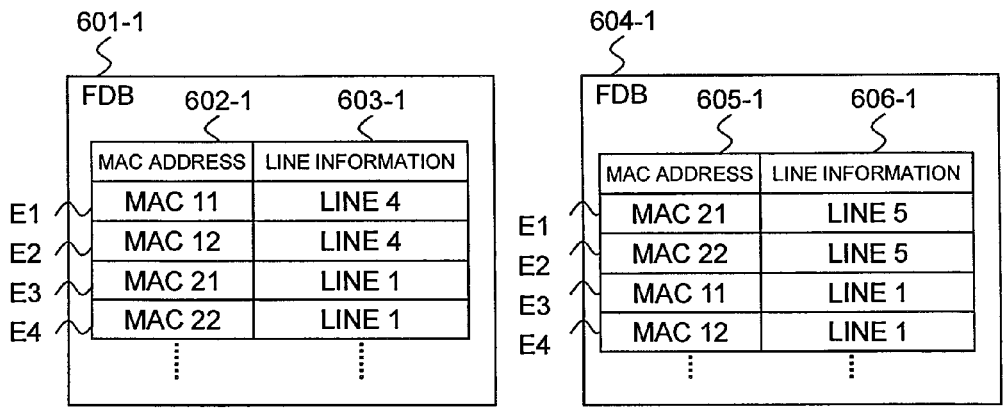
FIGS. 5A to 5C are views showing an FDB in the traffic movement example using the FDB clear.
Figure 5B:
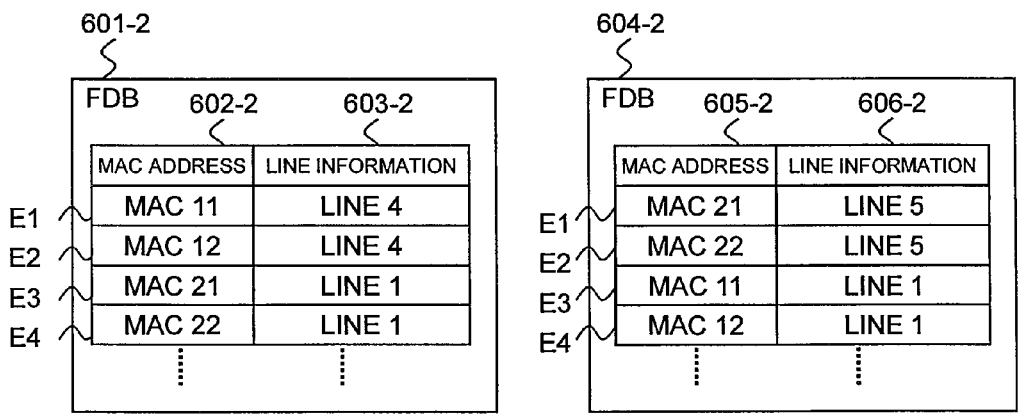
Figure 5C:
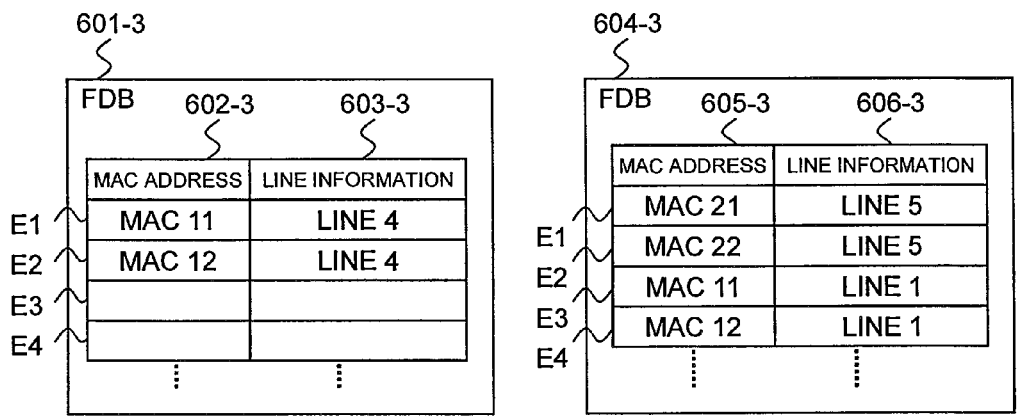
Figure 6:
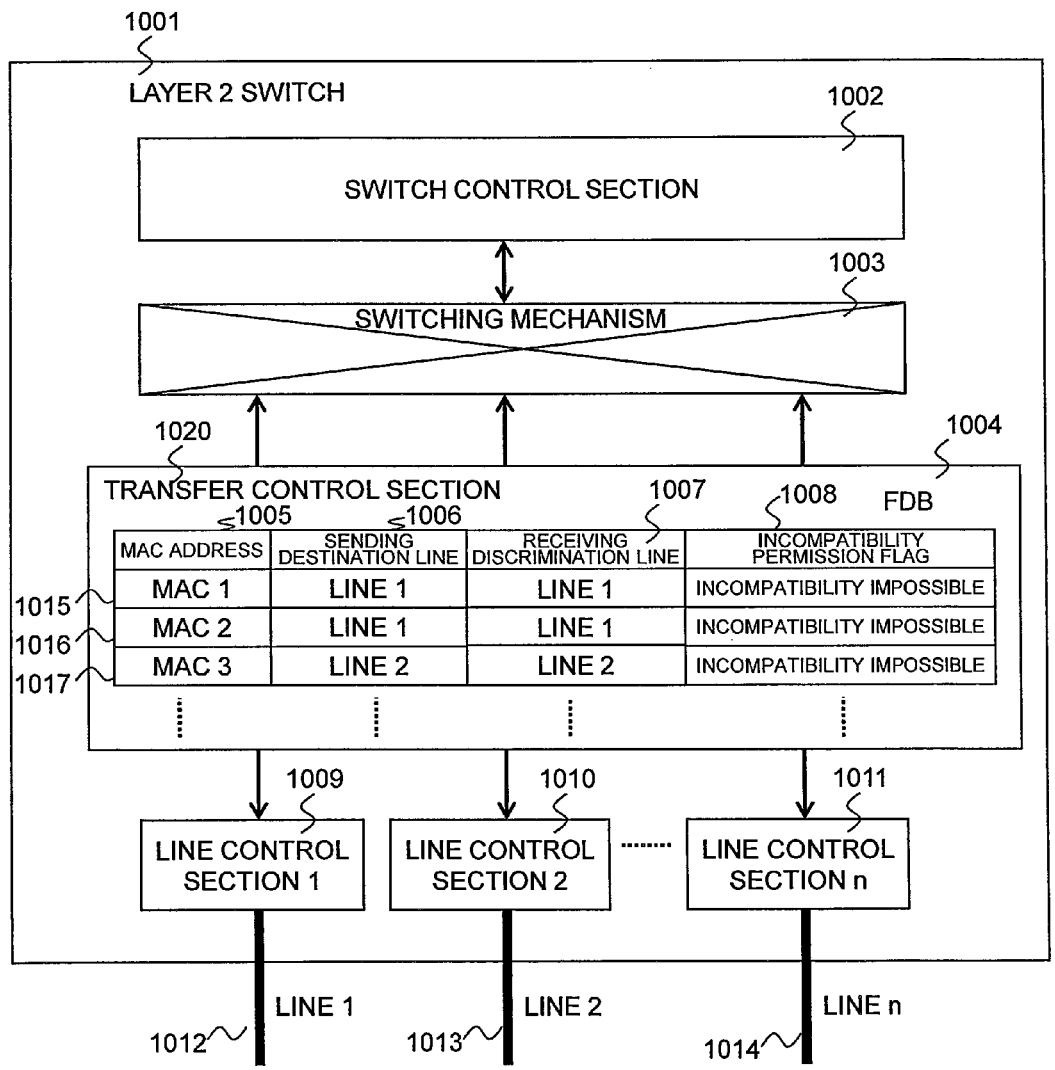
FIG. 6 is a view showing the configuration of the layer 2 switch having a mechanism of the invention.

FIG. 6 shows the configuration of a layer 2 switch (1001) according to an embodiment of the invention.

The layer 2 switch (1001) comprises a switching control section (1002) for controlling the overall layer 2 switch (1001) and performing a protocol process, a switching mechanism (1003) for transferring a frame from the receiving line to the sending line, a line control section 1 (1009) to a line control section n (1011) for controlling the line 1 (1012) to the line n (1014), respectively, and a transfer control section (1020) having an FDB (1004). The FDB (1004) stores a MAC address information (1005), a sending destination line information (1006), a receiving discrimination line information (1007), and an incompatibility permission flag (1008) which are associated with one another. The sending destination line information (1006) and the receiving discrimination line information (1007) are the identification information of the line, for example. The FDB (1004) may be in a memory inside the transfer control section (1020), or another memory. The layer 2 switch (1001) is connected to another layer 2 switch or the terminal.

Figure 12:
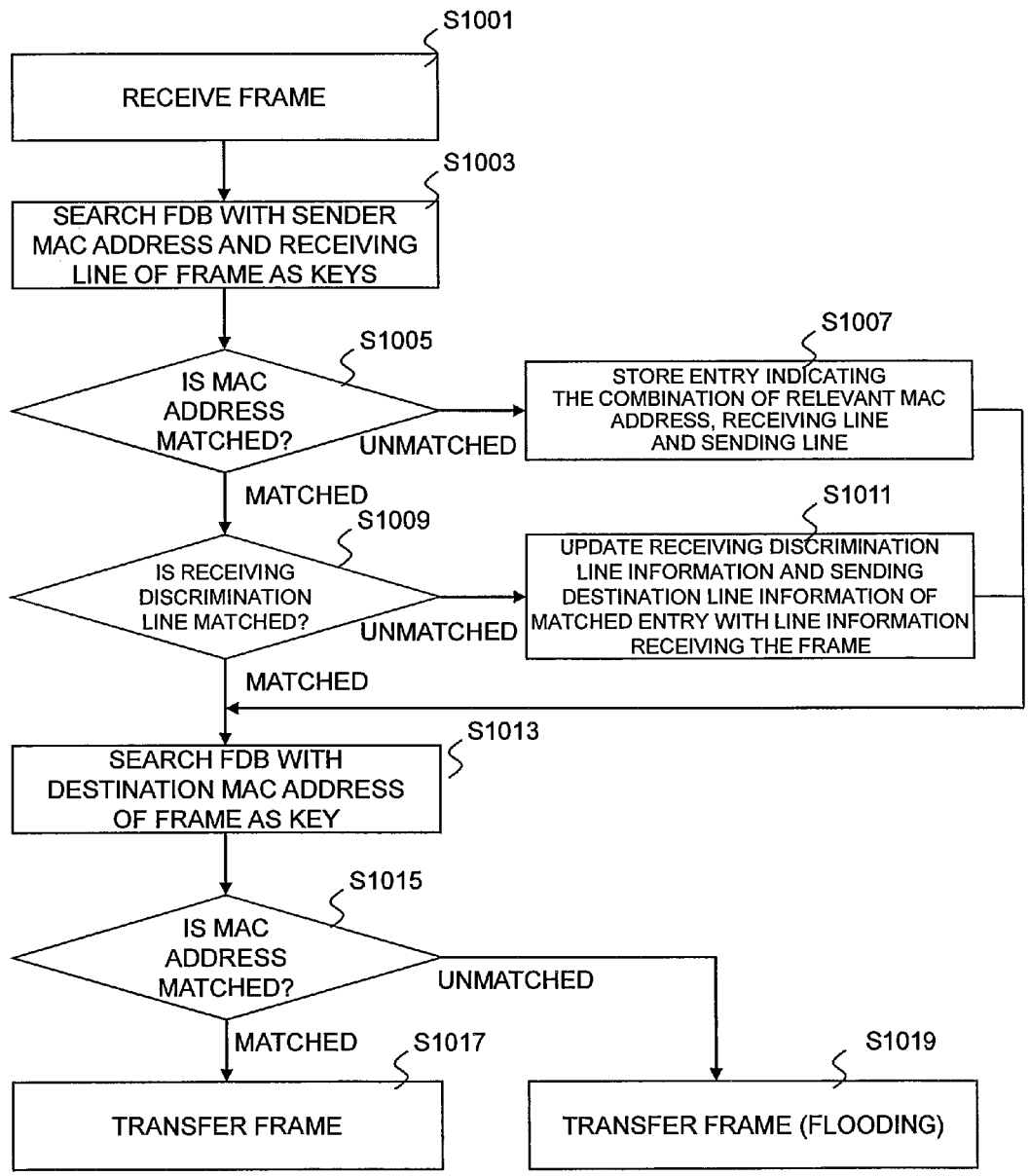
FIG. 12 is a flowchart showing a basic processing flow of the MAC address learning in the FDB.

The MAC address learning of the FDB (1004) in the layer 2 switch (1001) will be described below. In the layer 2 switch (1001), the correspondence between the MAC address and the identification information of the line receiving the frame is learned from the received frame, and held as a database in the FDB (1004). This is called MAC address learning. Reference to a flowchart of FIG. 12 is made for explanation. FIG. 12 is an explanatory view for the address learning and the frame transfer in the FDB that has separately the sending destination line information and the receiving discrimination line information.

First of all, a transfer process for the MAC address learned frame will be described below. If the frame in which the source MAC address is MAC1 and the destination MAC address is MAC3 is received from the line 1 (1012) (S1001), the received frame is transferred via the line control section 1 (1009) to the switching mechanism (1003). On this occasion, the transfer control section (1020) searches the FDB (1004).

Firstly, the transfer control section (1020) searches for the MAC address (1005) and the receiving discrimination line (1007) with the MAC1 of the source MAC address of the received frame and the identification information of the line 1 of the receiving line as the keys (S1003). In the FDB (1004) as shown in FIG. 6, an entry (1015) for the MAC1 is matched, and the source MAC address is discriminated as MAC address learned, and no new learning is made (S1005 and S1009).

Secondly, the transfer control section (1020) searches for the MAC address (1005) with the MAC3 of the destination MAC address as the key (S1013). In this example, an entry (1017) for the MAC3 is matched, and it is derived from the corresponding sending destination line information (1006) that the sending destination line is the line 2 (S1015). Based on this information, the switching mechanism (1003) transfers this frame to the line control section 2 (1010), so that the frame is sent out to the line 2 (1013) (S1017).

Next, a transfer process where the frame with the MAC4 that is not MAC address learned as the source MAC address is received in the FDB (1004) will be described below. An instance where the frame, the source MAC address of which is MAC4 and the destination MAC address of which is MAC3, is received from the line 1 (1012) is exemplified.

Firstly, the transfer control section (1020) searches for the MAC address (1005) and the receiving discrimination line (1007) with the MAC4 of the source MAC address of the received frame and the identification information of the line 1 of the receiving line as the keys (S1003). In this example, there is no entry for the MAC4, and the source MAC address is discriminated as MAC address unlearned (S1005), whereby learning is newly made (S1007). For example, the transfer control section (1020) stores the new entry in which the MAC address (1005) is MAC4 and the sending destination line (1006) and the receiving discrimination line (1007) are the line 1 in the FDB (1004).

Secondly, the transfer control section (1020) searches for the MAC address (1005) with the MAC3 of the destination MAC address as the key (S1013). In this example, the entry (1017) for the MAC3 is matched, and it is derived from the corresponding sending destination line information (1006) that the sending destination line is the line 2 (S1015). Based on this information, the switching mechanism (1003) transfers this frame to the line control section 2 (1010), so that the frame is sent out to the line 2 (1013) (S1017).

Next, a transfer process where the frame with the MAC2 that is MAC address learned in the FDB (1004) as the source MAC address is received from the line 2 different from the receiving discrimination line (1007) stored in the FDB will be described below. For example, this corresponds to a process for receiving the frame from the old line in a state where the sending destination line (1006) is already rewritten for the line transition. An instance where the frame, the source MAC address of which is MAC2 and the destination MAC address of which is MAC1, is received from the line 2 (1013) is exemplified.

Firstly, the transfer control section (1020) searches the FDB (1004) for the MAC address (1005) and the receiving discrimination line (1007) with the MAC2 of the source MAC address of the received frame and the line 2 of the receiving line as the keys (S1003). In this example, there is an entry (1016) for the MAC2 matched with the MAC address (1005) (S1005), but the receiving discrimination line (1007) is discriminated as unmatched (S1009). In this case, the transfer control section (1020) discriminates that the line connecting the terminal originating the frame with the MAC2 as the source MAC address is changed, and changes and stores the information of the receiving discrimination line (1007) of the relevant entry (1016) from the line 1 to the line 2 (S1011).

Secondly, the transfer control section (1020) searches for the MAC address (1005) with the MAC1 of the destination MAC address as the key (S1013). The entry (1015) for the MAC1 is matched, and it is derived that the sending destination line is the line 1 (S1015). Based on this information, the switching mechanism (1003) transfers this frame to the line control section 2 (1009), so that the frame is sent out to the line 1 (1012) (S1017).

In this example, the transfer control section (1020) searches for the destination MAC address, in which if no entry is matched, the frame is transferred by flooding (S1019).

Figure 7A:
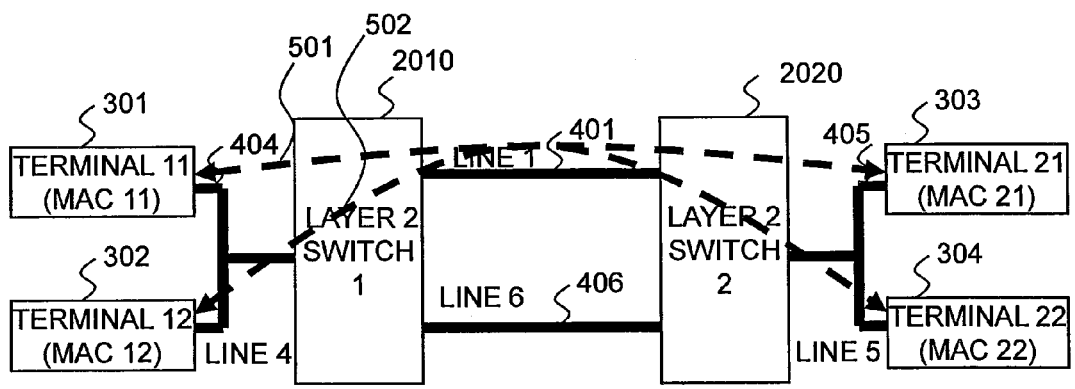
FIGS. 7A and 7B are diagrams showing a traffic movement example according to the invention.
Figure 7B:
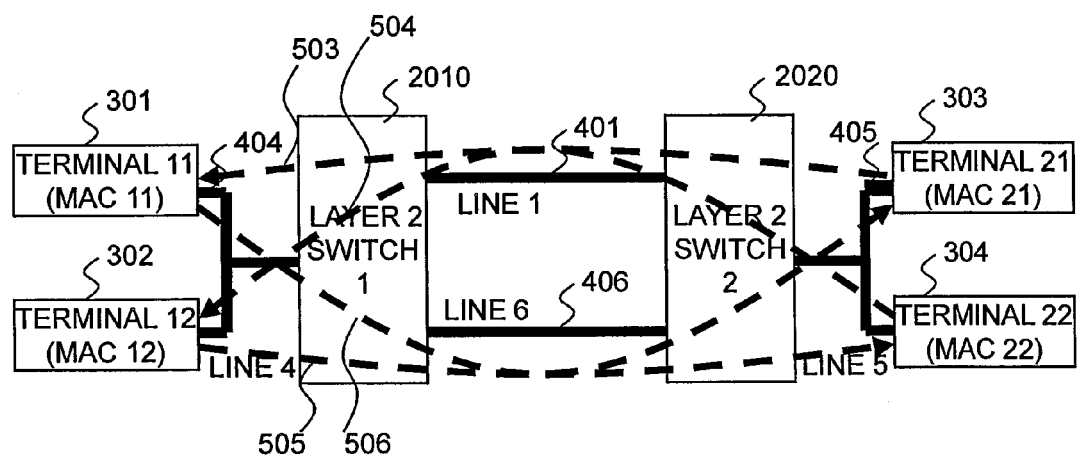

FIGS. 7A and 7B are diagrams showing the case of connecting oppositely two layer 2 switches having the function as described previously using FIG. 6. FIGS. 8 and 9 are examples of the FDB for the layer 2 switches.

FIG. 7A shows a state where the line 6 (406) as a new line is newly connected to the line 1 (401) originally used for the communication. Also, the terminal 11 (301) has MAC11 as the MAC address. Similarly, the terminal 12 (302) has MAC12, the terminal 21 (303) has MAC21, and the terminal 22 (304) has MAC22. FIGS. 8A and 9A show an FDB (1101-

1) and FDB (1106-1) of the layer 2 switch 1 (2010) and a layer 2 switch 2 (2020) in FIG. 7A, respectively. E1 to E4 designate the entries of each FDB. In FIG. 7A, the arrow (501) of the figure indicates the flow of traffic from the terminal (301) to the terminal 21 (303). Similarly, the arrow (502) indicates the flow of traffic from the terminal 12 (302) to the terminal 22 (304).

At this time, because of the communication via the line 1 (401), a sending destination line (1103-1) and a receiving discrimination line (1104-1) in the entry (E3) and the entry (E4) for the MAC21 and the MAC22 store the information of the line 1 in the FDB (1101-1) of the layer 2 switch 1 (2010).

Also, since the terminal 11 (301) and the terminal 12 (302) are connected to the line 4 (404), the sending destination line (1103-1) and the receiving discrimination line (1104-1) of the entry (E1) and the entry (E2) for the MAC11 and the MAC12 store the information of the line 4. This is true of the FDB (1106-1) in the layer 2 switch 2 (2020).

Herein, a method for connecting the new line 6 (406) and moving the traffic being communicated via the line 1 (401) to the line 6 (406) will be described below. FIG. 7B shows a state where the line 6 (406) is newly connected in FIG. 7A.

Firstly, for the FDB (1101-1) of the layer 2 switch 1 (2010), the entry in which the sending destination line (1103-1) is the line 1 is first of all retrieved via the switch control section (1002) of the layer 2 switch 1 (2010) by any means such as a manager command, configuration, or SNMP, in which an incompatibility permission flag (1105-1) of the matched entry is rewritten into an incompatibility possible state. In this example, the entry (E3) and the entry (E4) apply, in which the incompatibility permission flags (1105-1) of these entries are rewritten into the incompatibility possible state. A switching instruction to the layer 2 switch will be described later.

Secondly, the entry in which the sending destination line (1103-1) is the line 1 is similarly retrieved by any means such as a manager command, configuration, or SNMP, in which the sending destination line (1103-1) of the matched entry is rewritten into the line 6. In this example, the entry (E3) and the entry (E4) apply, in which these sending destination lines (1103-1) are rewritten into the line 6. FIG. 8B shows an FDB (1101-2) in the layer 2 switch 1 (2010) after the above process is performed.

Figure 13:
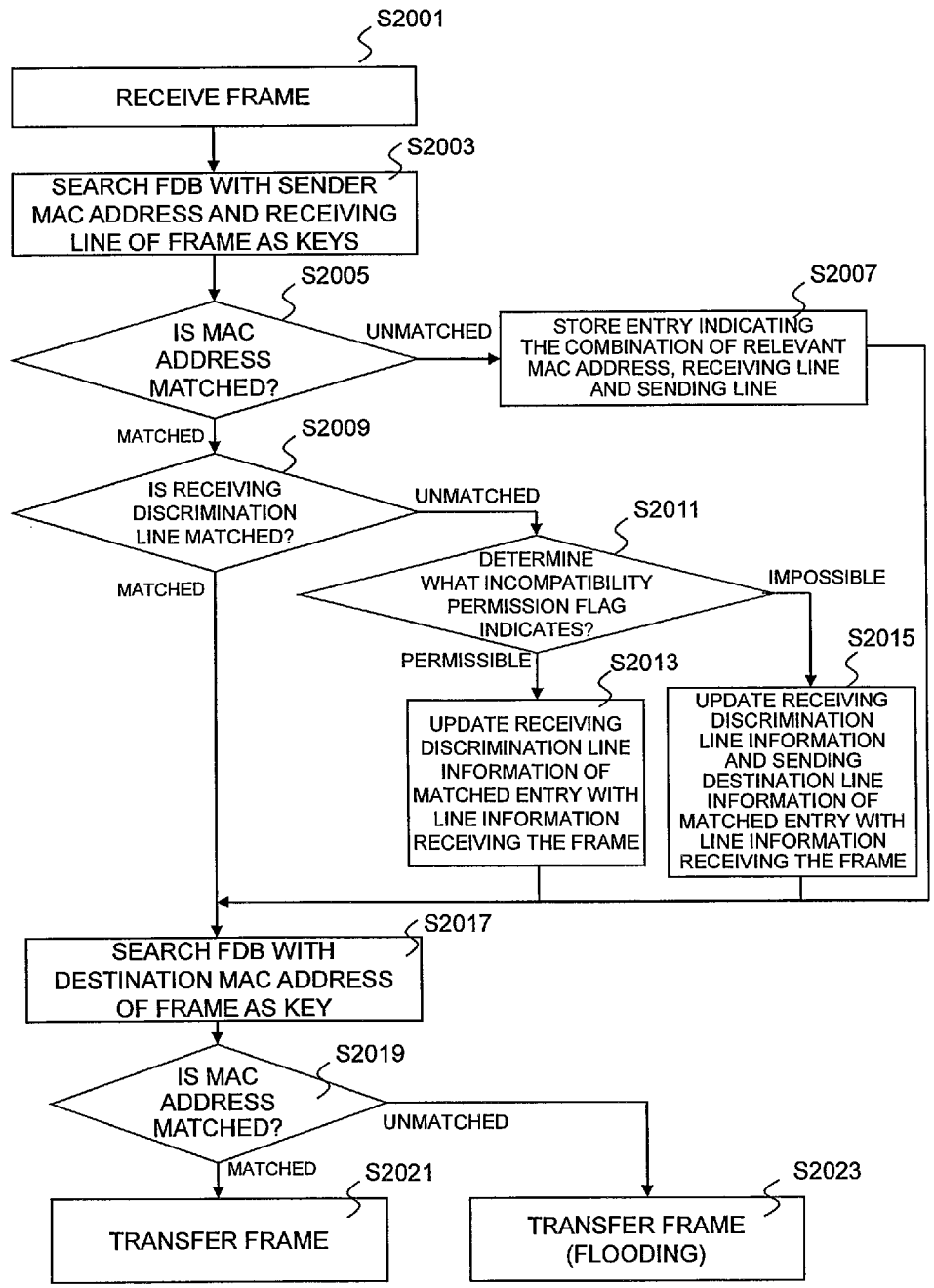
FIG. 13 is a flowchart showing a processing flow of the MAC address learning in the FDB of the invention.

A frame transfer process will be described below. Reference to a flowchart of FIG. 13 is made for explanation. FIG. 13 shows the operation of the layer 2 switch according to this embodiment.

At this point of time, according to the FDB (1101-2), the frame originated from the terminal 11 (301) and directed to the terminal 21 (303) has the source MAC address of MAC11, and the destination MAC address of MAC21, for example, whereby in searching the FDB in the layer 2 switch (201), the MAC address (1102-2) and a receiving discrimination line (1104-2) are firstly retrieved with the MAC11 of the source MAC address of the received frame and the line 4 of the receiving line as the keys (S2003). In this case, the entry (E1) for the MAC11 is matched, whereby it is discriminated that the source MAC address is MAC address learned, and no learning is newly made (S2005 and S2009).

Secondly, a MAC address (1102-2) is retrieved with the MAC21 of the destination MAC address as the key (S2017). In this example, the entry (E3) for the MAC21 is matched, and it is derived that the sending destination line is the line 6 (S2019). Thereby, the frame originated from the terminal 11 (301) and directed to the terminal 21 (303) is delivered via not the line 1 (401) but the line 6 (406) to the layer 2 switch 2 (2020).

In receiving this frame in the layer 2 switch 2 (2020), a MAC address (1107-1) and a receiving discrimination line (1109-1) are retrieved with the MAC11 of the source MAC address of the frame and the line 6 of the receiving line as the keys (S2003). In this case, the MAC11 of the MAC address is matched (S2005), as indicated in the FDB (1106-1). Since the terminal 11 (301) receives from the different line though the line (401) is the receiving discrimination line, it is discriminated that the line to which the terminal is connected is changed (S2009). Further, it is discriminated that the incompatibility permission flag (1110-1) indicates the incompatibility impossible (S2011), whereby the information of a sending destination line (1108-1) and the receiving discrimination line (1109-1) of the entry (E3) is changed from the line 1 to the line 6 and stored (S2015). In the layer 2 switch 2 (2020), since the incompatibility permission flag is not changed to the incompatibility possible, unlike the layer 2 switch 1 (2010), both the sending destination line (1108-1) and the receiving discrimination line (1109-1) are rewritten. This is true of the frame originated from the terminal 12 (302) and directed to the terminal 22 (304). FIG. 9B shows an FDB (1106-2) after rewriting the layer 2 switch 2 (2020).

Herein, the traffic in the reverse direction will be described below. The frame originated from the terminal 21 (303) and directed to the terminal 11 (301) is delivered via the line 6 (406) to the layer 2 switch 1 (2010) in accordance with the FDB (1106-2) of the layer 2 switch 2 (2020).

In the layer 2 switch 1 (2010), since the terminal 21 (303) receives from the different line (S2009) though the line 1 (401) is the receiving discrimination line, it is discriminated that the line to which the terminal is connected is changed as previously described, and additionally it is discriminated that an incompatibility permission flag (1105-2) indicates the incompatibility possible (S2011), whereby the information of the receiving discrimination line (1104-2) of the entry (E3) is changed from the line 1 to the line 6 and stored. This is true of the traffic between the terminal 12 (302) and the terminal 22 (304). FIG. 8C shows an FDB (1101-3) after rewriting the layer 2 switch 1 (2010).

Through one series of operations as described above, the traffic between the terminal 11 (301) and the terminal 21 (303), and between the terminal 12 (302) and the terminal 22 (304) can be moved from the line 1 (401) to the line 6 (406).

If the traffic originated from the terminal 11 (301) and directed to the terminal 21 (303) transfers to the line 6 (406) by rewriting the sending destination line of the layer 2 switch (201) and the incompatibility permission flag and arrives at the layer 2 switch 2 (2020), and before the line to which the terminal 11 (301) is connected is stored in the FDB, discriminating that it is changed in the FDB of the layer 2 switch 2 (2020), a frame is originated from the terminal 21 (303) to the terminal 11 (301), the frame is delivered via the line 1 (401) to the layer 2 switch 1 (2010) in accordance with the entry (E1) of the FDB (1106-1).

However, even if the FDB (1101-2) has the incompatibility permission flag (1105-2), with a sending destination line (1103-2) and the receiving discrimination line (1104-2) separately stored, and the line 6 (406) that is the line at the time of sending out and the line 1 (401) that is the line at the time of receiving are different, it is possible to preserve that the sending destination line (1103-2) of the line information at the time of sending out is the line 6 (406).

Herein, if the incompatibility permission flag is not provided and the sending destination line and the receiving discrimination line are learned to designate the same line, like the FDB (601-1) as described with the prior second technique, the sending destination line together with the receiving discrimination line is rewritten again into the line 1, whereby the traffic originated from the terminal 11 (301) and directed to the terminal 21 (303) is returned to the line 1 (401).

Through the above process, the traffic can be moved from the line 1 (401) to the line 6 (406). After the traffic is moved, an incompatibility permission flags (1105-3) of the entry (E3) and the entry (E4) in the FDB (1101-3) are returned to the incompatibility impossible state by the same means, whereby the normal transfer state is restored. For example, when the sending destination line information and the receiving discrimination line information turn from the different state to the coincident state, or after the passage of a certain time, or at the moment of the statistical information (e.g., frame statistical information with a counter) obtained in another block of the layer 2 switch, the incompatibility permission flag can be returned to the incompatibility impossible state.

The incompatibility permission flag may be the proper information indicating whether or not the incompatibility is permitted or the proper information indicating the line changing, instead of the flag.

In this embodiment, if a switching instruction from the line 1 (401) to the line 6 (406) is made to the layer 2 switch 1 (2010), the FDB of the opposed layer 2 switch 2 (2020) is also updated.

Figure 11A:
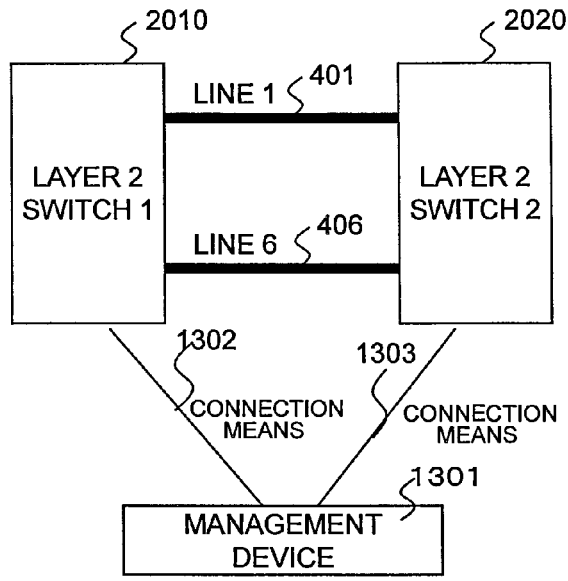
FIGS. 11A and 11B are diagrams showing a system for controlling the traffic movement of the invention with the control information.

A system for controlling the layer 2 switch according to the first embodiment will be described below. FIG. 11A shows the configuration in which the layer 2 switch and a management device (1301) are connected. The management device (1301) is connected to the layer 2 switch 1 (2010) and the layer 2 switch 2 (2020). It does not matter if the connection means (1302), (1303) may be a network or a serial cable.

Figure 11B:
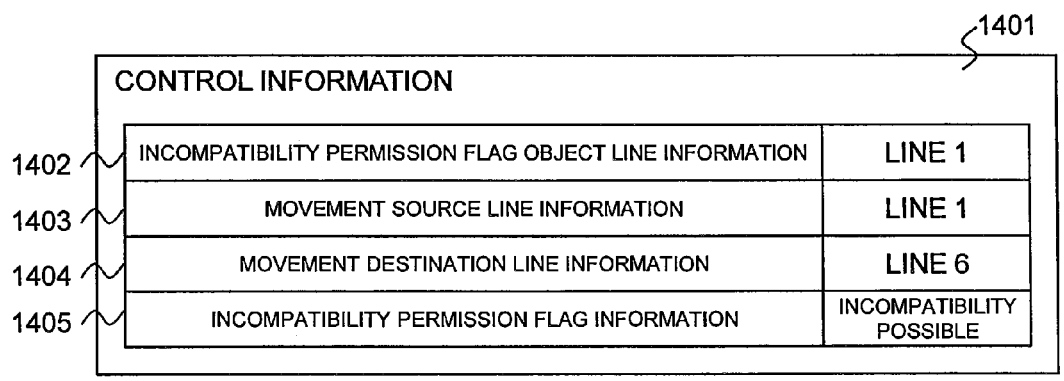

In the case where the traffic is moved from the line 1 (401) to the line 6 (406), control information (1401) is employed as shown in FIG. 11B. The control information (1401) includes incompatibility permission flag object line information (1402), movement source line information (1403), movement destination line information (1404) and incompatibility permission flag information (1405).

This control information (1401) is issued from the management device (1301) to the layer 2 switches (2010, 2020) through the automatic operation according to some procedure or policy such as a command operation, configuration operation, or SNMP by the manager. In this embodiment, the control information may be sent to only one of the opposed two layer 2 switches. The switch control section (1002) of the layer 2 switch receiving it searches for the sending destination line (1006) of the FDB (1004) with the incompatibility permission flag object line information (1402) as the key as described above, and rewrites the incompatibility permission flag (1008) of the matched entry in accordance with the incompatibility permission flag information (1405). Similarly, the switch control section (1002) searches for the sending destination line information (1006) with the movement source line information (1403) as the key, and rewrites the sending destination line (1006) of the matched entry in accordance with the movement destination line information (1404).

After the movement of the traffic is ended, the control information (1401) including the incompatibility permission flag object line information (1402) and the incompatibility permission flag information (1405) may be sent to the switch to change the incompatibility permission flag (1008) to the incompatibility impossible state that is the normal state.

With the above configuration, system, and process, the rewrite of the incompatibility permission flag and the rewrite of the sending destination line are realized, whereby the traffic can be moved.

Second Embodiment

A second embodiment will be described below.

The configuration of the layer 2 switch and the system for controlling the layer 2 switch are the same as in the first embodiment. In this embodiment, an FDB (1201) of FIG. 10 is employed. Though the sending destination line and the receiving discrimination line are separately stored in the previous embodiment, one line information (1203) is provided like the FDB (1201), and if the incompatibility is possible in accordance with the incompatibility permission flag (1204), the rewrite of the line information is suppressed not to detect the port movement for the entry MAC address learned, even though the line information (1203) corresponding to the source MAC address of the received frame and the line receiving the frame are incompatible (S3011 and S3013 of FIG. 14). Thereby, the same effect as the first embodiment can be obtained.

Figure 14:
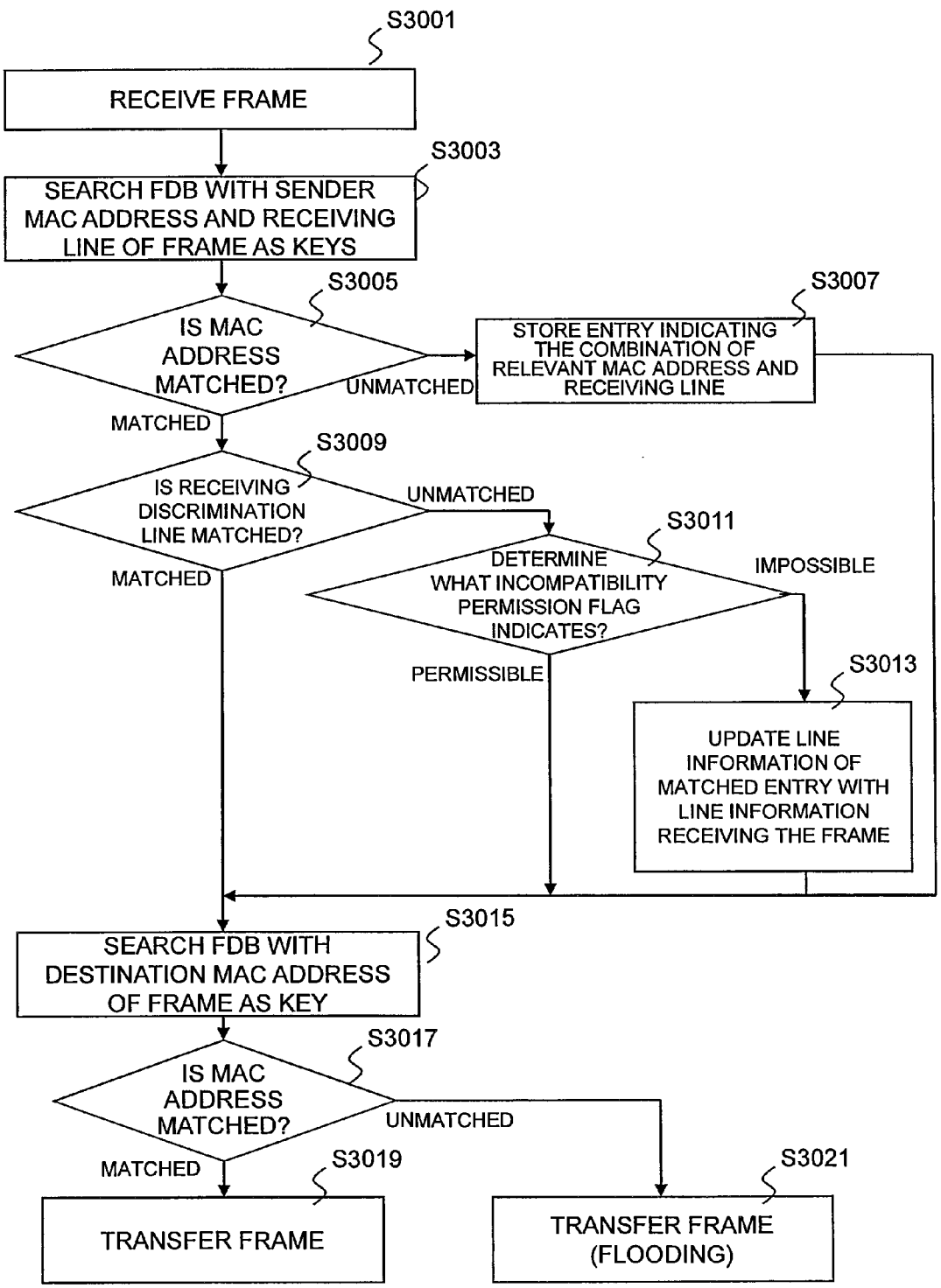
FIG. 14 is a flowchart showing a processing flow of the MAC address learning in the FDB according to the second embodiment of the invention.

FIG. 14 is a flowchart showing the operation of the second embodiment.

The transfer control section 1020 receives the frame (S3001), and searches the FDB (1201) for the MAC address (1202) and the line information (1203) with the source MAC address of the frame and the identification information of the receiving line as the keys (S3003). If there is no entry matched with the source MAC address (S3005), the transfer control section 1020 adds a combination of the source MAC address and the receiving line to the new entry of the FDB.

On the other hand, if there is any entry matched with the source MAC address (S3005), and the identification information of the receiving line is matched with the line information (1203) (S3009), the operation goes to step S3015, discriminating that the address learning is already made. If there is any entry matched with the source MAC address (S3005) but the identification information of the receiving line is not matched with the line information (1203) (S3009), the transfer control section 1020 refers to the incompatibility permission flag of the FDB (1201) (S3011). If the incompatibility permission flag indicates the incompatibility permission (S3011), the transfer control section 1020 does not detect the port movement (rewrite the address) for the relevant entry address learned, and the operation goes to step S3015. If the incompatibility permission flag indicates the incompatibility impossible (S3011), the line information (1203) of the entry with the MAC address matched is updated to the identification information of the line receiving the frame (S3013).

The steps 3015 to 3021 are the same as the steps S2017 to S2023 of FIG. 13.

The invention is applicable to the layer 2 switch and the network system having the layer 2 switch, for example.

What is claimed is:

1. A switch comprising:
    a transfer control section comprising:
        a memory, the memory comprising a plurality of entries, each entry comprising:
            MAC address information,
            line identification information comprising:
                stored sending destination line information,
                stored receiving discrimination line information, and
                an incompatibility permission flag having a permissible state and an impossible state;
    wherein the transfer control section is configured to:
        receive a frame from a source line and send the frame to another switch or terminal through a destination line; the frame comprising a source MAC address and a destination MAC address, the source line comprising source sending destination line information and source receiving discrimination line information;
the destination line comprising destination line information;
search the memory for a single entry comprising the source MAC address and the source receiving discrimination line information, wherein the transfer control section is configured to use the source MAC address and source receiving discrimination line information as search keys to search the memory;
if an entry comprising the source MAC address and the source receiving discrimination line information is identified, then the transfer control section is configured to determine that the source MAC address and the source receiving discrimination line information are already stored in the memory;
else if the source MAC address is not found in the memory, then the transfer control section is configured to add an entry to the memory comprising the source MAC address, source sending destination line information and source receiving discrimination line information;
else if the source MAC address is found in the memory, but the entry comprising the source MAC address has a different stored receiving discrimination line information than the source receiving discrimination line information of the source line, then the transfer control section is configured to:
update the stored receiving discrimination line information with the receiving discrimination line information of the source line that received the frame, if the state of the compatibility flag is permissible;
update the stored discrimination receiving line information and the sending destination line information with the receiving discrimination line information and the sending destination line information of the source line that received the frame, if the state of the compatibility flag is impossible; and
search the memory for a single entry comprising the destination MAC address, wherein the transfer control section is configured to use the destination MAC address as a search key to:
select the stored destination line information in the entry comprising the destination MAC address information to function as a destination line, if the destination MAC address is found,
instruct the switching mechanism to transfer the frame via the destination line, if the destination MAC address is found, and
instruct the instruct the switching mechanism to transfer the first frame by flooding, if the destination MAC address is not found.

2. The switch of claim 1, wherein the switch is connected to a management device configured to issue control information to the switch;
wherein the control information comprises:
incompatibility permission flag object line information, movement source line information,
movement destination line information, and
incompatibility permission flag information; and
the switch further comprises a switch control section configured to:
receive the control information;
instruct the transfer control section to search the memory for an entry comprising the stored sending destination line information with the incompatibility permission flag object line information, the incompatibility permission flag object line information functioning as a search key,
instruct the memory to overwrite the incompatibility permission flag of the entry comprising the stored sending destination line information with the incompatibility permission flag information,
instruct the transfer control section to search the memory for an entry comprising the stored sending destination line information with the movement source line information as the key, and
instruct the memory to overwrite the sending destination line of the entry comprising the stored sending matched entry in accordance with the movement destination line information.

3. The switch of claim 1, wherein the switch comprises:
a first line control section for controlling a first line;
a second line control section for controlling a second line, and
an nth line control section for controlling an nth line.

4. The switch of claim 2, wherein the switch is configured to change an incompatibility permission flag of the memory from permissible to impossible after traffic has been transferred from the source line to the destination line.

5. The switch of claim 2, wherein the memory is a filtering database, and the switch is a layer 2 switch.

6. A network system comprising:
a first switch comprising:
a transfer control section comprising:
a memory, the memory comprising a plurality of entries, each entry comprising:
MAC address information,
line identification information comprising:
stored sending destination line information,
stored receiving discrimination line information, and
an incompatibility permission flag having a permissible state and an impossible state;
wherein the transfer control section is configured to:
receive a frame from a source line and send the frame to another switch or terminal through a destination line;
the frame comprising a source MAC address and a destination MAC address,
the source line comprising source sending destination line information and source receiving discrimination line information;
the destination line comprising destination line information;
search the memory for a single entry comprising the source MAC address and the source receiving discrimination line information, wherein the transfer control section is configured to use the source MAC address and source receiving discrimination line information as search keys to search the memory;
if an entry comprising the source MAC address and the source receiving discrimination line information is identified, then the transfer control section is configured to determine that the source MAC address and the source receiving discrimination line information are already stored in the memory;
else if the source MAC address is not found in the memory, then the transfer control section is configured to add an entry to the memory comprising the source MAC address, source sending destination line information and source receiving discrimination line information;

else if the source MAC address is found in the memory, but the entry comprising the source MAC address has a different stored receiving discrimination line information than the source receiving discrimination line information of the source line, then the transfer control section is configured to:
  update the stored receiving discrimination line information with the receiving discrimination line information of the source line that received the frame, if the state of the compatibility flag is permissible;
  update the stored discrimination receiving line information and the sending destination line information with the receiving discrimination line information and the sending destination line information of the source line that received the frame, if the state of the compatibility flag is impossible;
  search the memory for a single entry comprising the destination MAC address, wherein the transfer control section is configured to use the destination MAC address as a search key to:
    select the stored destination line information in the entry comprising the destination MAC address information to function as a destination line, if the destination MAC address is found,
    instruct the switching mechanism to transfer the frame via the destination line, if the destination MAC address is found, and
    instruct the instruct the switching mechanism to transfer the first frame by flooding, if the destination MAC address is not found;
a second switch connected to the first switch via the destination line; and
a management device that outputs control information to the first switch, the second switch, or both.

7. The switch of claim 6, wherein the control information comprises:
  incompatibility permission flag object line information,
  movement source line information,
  movement destination line information, and
  incompatibility permission flag information; and
the first switch further comprising a switch control section configured to:
  receive the control information;
  instruct the transfer control section to search the memory for an entry comprising the stored sending destination line information with the incompatibility permission flag object line information, using the incompatibility permission flag object line information functioning as a search key,
  instruct the memory to overwrite the incompatibility permission flag of the entry comprising the stored sending destination line information with the incompatibility permission flag information,
  instruct the transfer control section to search the memory for an entry comprising the stored sending destination line information with the movement source line information as the key, and
  instruct the memory to overwrite the sending destination line of the entry comprising the stored sending matched entry in accordance with the movement destination line information.

8. A method of routing traffic with a switch, the method comprising:
  receiving a frame from a source line;
  sending the frame to another switch or terminal through a destination line; wherein
  the frame comprises a source MAC address and a destination MAC address,
  the source line comprises source sending destination line information and source receiving discrimination line information;
  the destination line comprises destination line information;
  providing a transfer control section comprising:
    a memory, the memory comprising a plurality of entries, each entry comprising:
      MAC address information,
      line identification information comprising:
        stored sending destination line information,
        stored receiving discrimination line information, and
        an incompatibility permission flag having a permissible state and an impossible state;
    searching the memory for a single entry comprising the source MAC address and the source receiving discrimination line information, wherein searching comprises using the source MAC address and source receiving discrimination line information as search keys to search the memory;
    determining the source MAC address and the source receiving discrimination line information are already stored in the memory, if an entry comprising the source MAC address and the source receiving discrimination line information is identified;
    adding an entry to the memory comprising the source MAC address, source sending destination line information and source receiving discrimination line information, if the source MAC address is not found in the memory;
    updating the stored receiving discrimination line information with the receiving discrimination line information of the source line that received the frame, if the state of the compatibility flag is permissible, and if the source MAC address is found in the memory, but the entry comprising the source MAC address has a different stored receiving discrimination line information than the source receiving discrimination line information of the source line;
    updating the stored discrimination receiving line information and the sending destination line information with the receiving discrimination line information and the sending destination line information of the source line that received the frame, if the state of the compatibility flag is impossible, and if the source MAC address is found in the memory, but the entry comprising the source MAC address has a different stored receiving discrimination line information than the source receiving discrimination line information of the source line;
    searching the memory for a single entry comprising the destination MAC address, wherein searching comprises using the destination MAC address as a search key;
    selecting the stored destination line information in the entry comprising the destination MAC address information to function as a destination line, if the destination MAC address is found;
    transferring the frame via the destination line, if the destination MAC address is found; and transferring the first frame by flooding, if the destination MAC address is not found.

9. The method of claim 8, comprising
connecting the switch to a management device configured to issue control information to the switch, wherein the control information comprises:
  incompatibility permission flag object line information,
  movement source line information,
  movement destination line information, and
  incompatibility permission flag information; and
receiving the control information with the switch;
searching the memory for an entry comprising the stored sending destination line information with the incompatibility permission flag object line information, the incompatibility permission flag object line information functioning as a search key;
overwriting the incompatibility permission flag of the entry comprising the stored sending destination line information with the incompatibility permission flag information;
searching the memory for an entry comprising the stored sending destination line information with the movement source line information as the key; and
overwriting the sending destination line of the entry comprising the stored sending matched entry in accordance with the movement destination line information.

* * * * *